(12) United States Patent
Niimi et al.

(10) Patent No.: US 6,271,538 B2
(45) Date of Patent: *Aug. 7, 2001

(54) HIGH-FREQUENCY DETECTING ELEMENTS AND HIGH-FREQUENCY HEATER USING THE SAME

(75) Inventors: Hideaki Niimi, Hikone; Yuichi Takaoka, Shiga-ken, both of (JP)

(73) Assignee: Murata Manufacturing Co., Ltd., Nagaokakyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,017

(22) Filed: Nov. 26, 1997

Related U.S. Application Data

(62) Division of application No. 08/564,871, filed on Nov. 28, 1995, now Pat. No. 5,793,025.

(30) Foreign Application Priority Data

Nov. 28, 1994 (JP) .................................................. 6-293479

(51) Int. Cl.⁷ .............................. H01L 29/12; H05B 6/68
(52) U.S. Cl. .......................... 257/43; 257/728; 219/704; 219/709
(58) Field of Search ........................... 257/43, 275, 276, 257/482, 604, 728; 219/704, 709

(56) References Cited

U.S. PATENT DOCUMENTS

| | | | |
|---|---|---|---|
| 3,875,361 | 4/1975 | Fujui et al. | 219/710 |
| 3,987,267 | 10/1976 | Moore | 219/728 |
| 3,997,479 | 12/1976 | Shimojo et al. | 252/520 |
| 4,009,359 | 2/1977 | Tallmadge et al. | 219/709 |
| 4,101,454 | * 7/1978 | Kulwicki et al. | 252/514 |
| 4,401,885 | 8/1983 | Ishii et al. | 219/523 |
| 4,415,789 | 11/1983 | Nobue et al. | 219/709 |
| 4,616,289 | * 10/1986 | Itakura et al. | 361/321 |
| 4,716,279 | * 12/1987 | Hori et al. | 219/541 |
| 4,831,432 | * 5/1989 | Hori et al. | 257/43 |
| 5,017,534 | 5/1991 | Chaput et al. | 501/134 |
| 5,084,426 | 1/1992 | Iwaya et al. | 501/135 |
| 5,110,216 | 5/1992 | Wickersheim et al. | 374/122 |
| 5,171,947 | 12/1992 | Kusunoki et al. | 219/709 |
| 5,294,577 | 3/1994 | Yamamoto et al. | 501/134 |
| 5,378,875 | * 1/1995 | Hirama et al. | 219/705 |
| 5,414,403 | 5/1995 | Greuter et al. | 338/22 |

FOREIGN PATENT DOCUMENTS

| | | |
|---|---|---|
| 0 360 649 | 3/1990 | (EP) . |
| 2 263 173 | 7/1993 | (GB) . |
| 60-170188 | 9/1985 | (JP) . |
| 62-123226 | 6/1987 | (JP) . |
| 5-172884 | 7/1993 | (JP) . |

OTHER PUBLICATIONS

Database WPI, Section E1, Week 7549, Derwent Publications Ltd., London, GB; Class T06, AN 75–N0576W & SU–A–455 332 (MORA), Mar. 14, 1975 (English Abstract).
Official Letter from the Taiwan Intellectual Property Office Dated: Jan. 24, 2000.

* cited by examiner

Primary Examiner—Eddie Lee
Assistant Examiner—Allan R. Wilson
(74) Attorney, Agent, or Firm—Burns, Doane, Swecker & Mathis, LLP

(57) ABSTRACT

A high-frequency detecting element that can detect a temperature increase in an instant due to high-frequency wave absorption using semiconducting ceramic with positive resistance-temperature characteristics. The ceramic is composed mainly of barium titanate. A high-frequency heater incorporating the high-frequency detecting element is also disclosed. In the high-frequency detecting element, electrodes are provided on one main surface of semiconducting ceramic 1 with positive resistance-temperature characteristics and leads 3a and 3b are soldered to the electrodes 2a and 2b.

10 Claims, 1 Drawing Sheet

HIGH-FREQUENCY DETECTING ELEMENTS AND HIGH-FREQUENCY HEATER USING THE SAME

This application is a divisional, of application Ser. No. 08/564,871, file Nov. 28, 1995 now U.S. Pat. No. 5,793,025 issued Aug. 11, 1998.

BACKGROUND OF THE INVENTION

The present invention relates to a high-frequency detecting element and a high-frequency heater using the detecting element.

In a heater using high-frequency waves (e.g., microwaves), an object is heated mainly because water in the object absorbs the high-frequency waves. The object, when it contains enough water, is properly heated, but the heating continues even after water in the object has completely evaporated. The methods discussed below are available to prevent the heating from continuing after completion of water evaporation so that the object is heated only to an appropriate temperature.

The method disclosed in Japanese Published Unexamined Application No. 62-123226 uses a humidity sensor and an alcohol sensor. The humidity sensor and alcohol sensor are disposed in an exhaust duct and are used to sense water vapor and gas produced from an object in a heating chamber and exhausted from the chamber in order to select a particular cooking method.

The method disclosed in Japanese Published Unexamined Application No. 5-172884 uses a microwave sensor and a temperature sensor. A bridge circuit, comprising the microwave sensor and the temperature sensor, is disposed in a heating chamber. The microwave sensor is composed of a thermistor element for sensing the temperature of an electromagnetic-wave absorber as it heats up upon absorbing microwaves, and the temperature sensor is composed of an electromagnetic-wave reflector and a thermistor element. The electromagnetic-wave absorber and the electromagnetic-wave reflector face a heated object and the thermistor elements detect changes in the temperature of the electromagnetic-wave absorber and the electromagnetic-wave reflector during microwave heating.

The method disclosed in Japanese Published Unexamined Application No. 60-170188 uses a thermistor. Water vapor and gas produced from a heated object in a heating chamber are detected with an absolute temperature sensor or a gas sensor to control an increase in heating chamber temperature due to a heater, using the thermistor to stop the heating operation.

However, all of these methods suffer problems. The method disclosed in Japanese Published Unexamined Application No. 62-123226 has a problem of temperature sensor performance deteriorating due to soiling. The method disclosed in Japanese Published Unexamined Application No. 5-172884 has a problem of the thermistor is slow in responding to an increase in the temperature. The method disclosed in Japanese Published Unexamined Application No. 60-170188 has a problem of a reduction in accuracy due to indirect measurement of the temperature of a heated object.

BRIEF SUMMARY OF THE INVENTION

It is an object of the present invention to provide both a high-frequency detecting element that can detect a temperature increase in an instant due to high-frequency wave absorption and a high-frequency heater using the detecting element.

A first aspect of the present invention provides a high-frequency detecting element comprising semiconducting ceramic having positive resistance-temperature characteristics, i.e., electrical resistance increases with increased temperatures.

A second aspect of the present invention provides a high-frequency detecting element comprising semiconducting ceramic with positive resistance-temperature characteristics, composed mainly of barium titanate.

A third aspect of the present invention provides a high-frequency detecting element comprising semiconducting ceramic with positive resistance-temperature characteristics, on one main surface of which a pair of electrodes are formed.

A fourth aspect of the present invention provides a high-frequency detecting element comprising semiconducting ceramic with positive resistance-temperature characteristics, the ceramic being 4 mm or less in thickness.

A fifth aspect of the present invention provides a high-frequency detecting element comprising semiconducting ceramic with positive resistance-temperature characteristics, the ceramic having a Curie point of 150° or less.

A sixth aspect of the present invention provides a high-frequency heater including a heating chamber, a high-frequency generating means for generating high-frequency waves in the heating chamber, and a high-frequency detecting element detecting the high-frequency waves generated in the heating chamber.

A seventh aspect of the present invention provides a high-frequency heater whose high-frequency detecting element comprises semiconducting ceramic with positive resistance-temperature characteristics.

An eighth aspect of the present invention provides high-frequency heater whose high-frequency detecting element is composed mainly of barium titanate.

A ninth aspect of the present invention provides a high-frequency heater whose high-frequency detecting element comprises a semiconducting ceramic, on one main surface of which a pair of electrodes are formed.

A tenth aspect of the present invention provides a high-frequency heater whose high-frequency detecting element comprises a semiconducting ceramic with positive resistance-temperature characteristics, which ceramic is 4 mm or less thick.

A eleventh aspect of the present invention provides a high-frequency heater whose high-frequency detecting element comprises a semiconducting ceramic with a Curie point of 150° C. or less.

A twelfth aspect of the present invention provides a high-frequency heater wherein a high-frequency detecting element is disposed so that the other main surface of semiconducting ceramic comprising the detecting element, on which surface no electrodes are formed, faces a heating chamber in which high-frequency waves are generated.

A high-frequency detecting element of the present invention can be a semiconducting ceramic with positive resistance-temperature characteristics, composed mainly of barium titanate, which, when the high-frequency detecting element is exposed to high-frequency waves, generates heat and thus heats up the instant it absorbs the waves.

A high-frequency heater of the present invention uses a high-frequency detecting element comprising a semiconducting ceramic with positive resistance-temperature characteristics and composed mainly of barium titanate, the detecting element detecting temperature under the same conditions as an object is heated with high-frequency waves, since the element is placed in a heating chamber containing the object.

BRIEF DESCRIPTION OF THE DRAWINGS

The present invention will now be described by way of exemplary embodiments with reference to the accompanying drawings in which.

DETAILED DESCRIPTION OF PREFERRED EMBODIMENTS

Figure 1A:
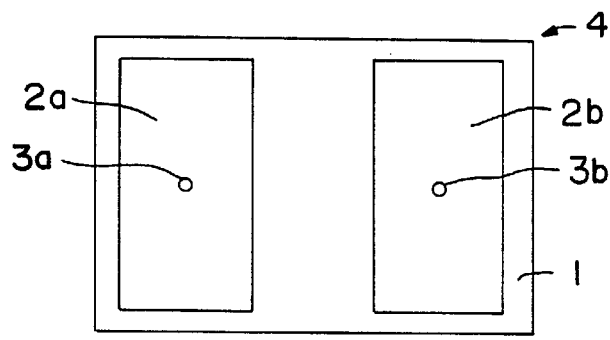
FIGS. 1(A) and 1(B) illustrate a high-frequency detecting element of the present invention, 1(A) being a top view of the element, and 1(B) being a side view of the element.
Figure 1B:
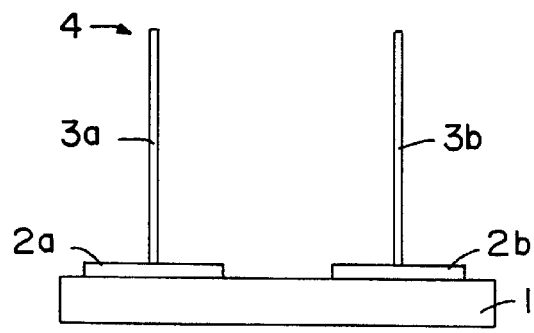

FIGS. 1(A) and 1(B) are a top view of a thermistor with positive characteristics and a side view of a high-frequency detecting element. The high-frequency detecting element 4 comprises semiconducting ceramic 1 with positive resistance-temperature characteristics, composed mainly of barium titanate, on one main surface of which ceramic electrodes 2a and 2b, attached with leads 3a and 3b by soldering, are provided.

The semiconducting ceramic 1 with positive resistance-temperature characteristics was prepared using the procedure below.

Measured is such an amount of barium carbonate, strontium carbonate, lead monoxide, lanthanum oxide, titanium oxide, silicon dioxide, and manganese monoxide that semiconducting ceramic of the composition $0.9798(Ba_{0.997-x-y}Sr_xPb_yLa_{0.003})_{1.01}TiO_3-0.02SiO_2-0.0002Mn$ is obtained after a mixture of those substances is calcined. The substances measured are mixed together with pure water and milled with zirconia balls for five hours and incompletely calcined at 1000° C. for two hours. The resulting powder is mixed with an organic binder, pressed in dry condition, and calcined at 1400° C. for two hours to obtain rectangular semiconducting ceramic of 5 mm×5 mm x 1 to 5 mm size.

Silver electrodes making an ohmic contact are formed on one main surface of the semiconducting ceramic. Leads are soldered to the electrodes to obtain a high-frequency detecting element.

The amount of Sr contained in the semiconducting ceramic with positive resistance-temperature characteristics, x, and that of Pb contained in the semiconducting ceramic, y, are varied to change the Curie point in the range from −20 to 200° C.

Figure 2:
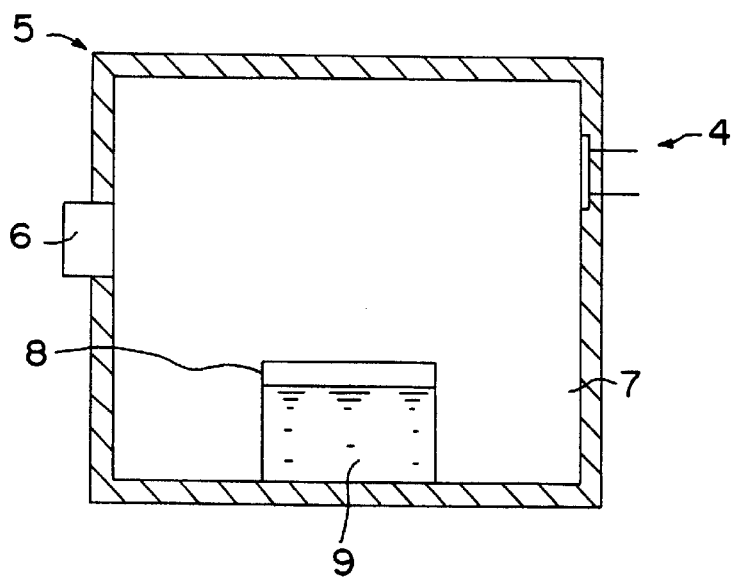
FIG. 2 is a cross-sectional view of a high-frequency heater of the present invention.

FIG. 2 is a partially cross-sectional view of a high-frequency heater. The high-frequency heater 5 comprises a high-frequency detecting element 4, high-frequency generating means 6, and a heating chamber 7. The high-frequency detecting element 4 is disposed so that a surface on which the electrodes 2a and 2b are not formed, faces inside the heating chamber 7 containing an object to be heated. When high-frequency waves are produced with the high-frequency generating means 6 to heat the object in the heating chamber 7, water vapor from the object changes high-frequency output received by the high-frequency detecting element 4. Due to the change in received high-frequency waves, the resistance of the detecting element changes. The rate of change in the resistance of the high-frequency detecting element 4, the heating condition of the object can be known.

To evaluate the high-frequency detecting element 4, the rate of change in the resistance of the high-frequency detecting element 4 was measured when the output of high-frequency waves was changed by changing the amount of water 9 in a container 8 placed in the heating chamber 7 of the high-frequency heater 5 with the high-frequency generating means 6 producing 2450-MHz high-frequency waves. A time constant was obtained by measuring the time required for the resistance to be increased by 20% from the initial value after application of high-frequency waves to 50 ml of water in the container. The results are shown in Table 1.

TABLE 1

| Sample No. | Curie point (° C.) | Element thickness (mm) | Percentage of resistance change one minutes after high-frequency wave output started (%) | | | Time constant (sec.) |
|---|---|---|---|---|---|---|
| | | | 50 ml of water | 100 ml of water | 200 ml of water | |
| 1 | 20 | 1.0 | 3.8 | 2.7 | 1.9 | 1.5 |
| 2 | 10 | 1.0 | 3.5 | 2.8 | 1.9 | 1.5 |
| 3 | 40 | 1.0 | 3.3 | 2.8 | 1.9 | 1.7 |
| 4 | 70 | 1.0 | 3.1 | 2.6 | 1.7 | 2.0 |
| 5 | 100 | 1.0 | 3.0 | 2.5 | 1.6 | 3.2 |
| 6 | 150 | 1.0 | 2.5 | 1.9 | 1.4 | 5.0 |
| 7 | 180 | 1.0 | 1.8 | 1.5 | 1.2 | 13 |
| 8 | 200 | 1.0 | 1.4 | 1.2 | 1.0 | 25 |
| 9 | 40 | 2.0 | 3.3 | 2.7 | 2.2 | 2.1 |
| 10 | 40 | 3.0 | 3.1 | 2.5 | 1.9 | 3.5 |
| 11 | 40 | 4.0 | 2.9 | 2.2 | 1.7 | 6.5 |
| 12 | 40 | 5.0 | 2.5 | 1.9 | 1.5 | 11 |

If the ceramic thickness exceeds 4 mm or the Curie point exceeds 150° C. the time constant becomes one order of magnitude larger.

When, for comparison purposes, a ferrite wave reflector with which a thermistor having negative characteristics was brought into contact according to Published Unexamined Application No. 5-172884 was tested in the same way as described above, it took about 10 seconds for the initial resistance of the thermistor to change by 20%.

An embodiment of the present invention can detect a high-frequency wave as a large resistance change, thus offering satisfactory high-frequency wave detection performance.

In particular, a Curie point below 150° C. and a ceramic thickness of 4 mm or less cause good high-frequency detection characteristics, i.e., a large resistance change and a small time constant, to be offered.

A high-frequency detecting element of the present invention comprises semiconducting ceramic with positive resistance-temperature characteristics, composed mainly of barium titanate. When the high-frequency detecting element is exposed to high-frequency waves, the semiconducting ceramic generates heat and thus heats up the instant it absorbs high-frequency waves, so that high-frequency waves can be detected with great precision and, with the time constant being small. Furthermore, one high-frequency detecting element can both absorb high-frequency waves and detect temperature, exhibiting a sharp response to high-frequency waves and correctly following temperature changes.

Since a high-frequency heater of the present invention is positioned in a heating chamber containing a high-frequency detecting element, that is, the high-frequency heater is under the same conditions as an object to be heated, the temperature of the object can directly be measured. Comprising semiconducting ceramic with positive resistance-temperature characteristics, composed mainly of barium titanate, the high-frequency detecting element can both absorb high-frequency waves and detect temperature with a high sensitivity in a short time in response to heat, thus allowing proper temperature control to be exercised and a temperature detecting unit to be reduced in size.

It will be appreciated by those of ordinary skill in the art that the present invention can be embodied in other specific forms without departing from the scope thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A high-frequency detecting element comprising:
   semiconducting ceramic with positive resistance-temperature characteristics and having a thickness between 1 mm and 4 mm; and
   not more than two electrodes, which are provided adjacently on said semiconducting ceramic.

2. The high-frequency detecting element according to claim 1, wherein said semiconducting ceramic includes barium titanate.

3. The high-frequency detecting element according to claim 1, wherein said semiconducting ceramic has a Curie point of 150° C. or less.

4. The high-frequency detecting element according to claim 2, wherein said semiconducting ceramic has a Curie point of 150° C. or less.

5. The high-frequency detecting element according to claim 1, wherein said not more than two electrodes consist of two electrodes located on one main surface of said semiconducting ceramic.

6. The high-frequency detecting element according to claim 5, further comprising:
   a frequency receiving surface of said semiconductor ceramic, said frequency-receiving surface not having electrodes formed thereon.

7. The high-frequency detecting element according to claim 6, wherein high-frequency waves received on said frequency receiving surface cause a change in resistance of said semiconducting ceramic.

8. A high-frequency detecting element for detecting a signal from a high frequency generating means, the high-frequency detecting element comprising:
   a semiconducting ceramic with positive resistance-temperature characteristics, said semiconducting ceramic having a high frequency receiving surface positioned relative to the high frequency generating means to receive the signal of the high frequency generating means; and
   two electrodes electrically bonded to an other surface of said semiconducting ceramic, said other surface not receiving the signal of the high frequency generating means;
   wherein a resistance of said semiconducting ceramic measured between the two electrodes changes in response to changes in the signal.

9. The high-frequency detecting element according to claim 8, wherein no more than said two electrodes are electrically bonded to said other surface of said semiconducting ceramic.

10. The high-frequency detecting element according to claim 8, wherein water vapor in a signal path between the high frequency generating means and the high frequency receiving surface of said semiconducting ceramic is a cause of said changes in the signal.

* * * * *